US012776137B2

(12) United States Patent
Kim et al.

(10) Patent No.: US 12,776,137 B2
(45) Date of Patent: Oct. 27, 2026

(54) IMAGE COLLECTION SENSOR DEVICE, UNMANNED COUNTING EDGE COMPUTING SYSTEM AND METHOD USING THE SAME

(71) Applicant: Electronics and Telecommunications Research Institute, Daejeon (KR)

(72) Inventors: Ryangsoo Kim, Daejeon (KR); Sung Chang Kim, Daejeon (KR); Hark Yoo, Daejeon (KR); Geun Yong Kim, Daejeon (KR); Jaein Kim, Daejeon (KR); Chorwon Kim, Daejeon (KR); Hee Do Kim, Daejeon (KR); Ji Hyoung Ryu, Daejeon (KR); Byung-Hee Son, Daejeon (KR); Kicheoul Wang, Daejeon (KR); Giha Yoon, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 160 days.

(21) Appl. No.: 18/509,271

(22) Filed: Nov. 14, 2023

(65) Prior Publication Data

US 2024/0161492 A1 May 16, 2024

(30) Foreign Application Priority Data

Nov. 15, 2022 (KR) ........................ 10-2022-0152876

(51) Int. Cl.

*G06V 10/94* (2022.01)
*G06T 7/00* (2017.01)
(Continued)

(52) U.S. Cl.

CPC ............ *G06V 10/95* (2022.01); *G06T 7/0002* (2013.01); *G06T 7/60* (2013.01); *G06T 7/70* (2017.01);
(Continued)

(58) Field of Classification Search

CPC ........ H04N 7/183; G06V 10/95; G06V 20/52; G06V 10/77; G06V 40/161; G06T 7/70;
(Continued)

(56) References Cited

U.S. PATENT DOCUMENTS 8,989,771 B2 3/2015 Kang et al.
10,579,880 B2 * 3/2020 Khorsandi ............. G06V 20/52
(Continued)

FOREIGN PATENT DOCUMENTS

KR 10-2280147 B1 7/2021
KR 10-2333143 B1 * 12/2021 ............... G06K 9/00
(Continued)

OTHER PUBLICATIONS

Kim, Geun-Yong, et al. "DNN inference offloading for object detection in 5G multi-access edge computing." *2021 International Conference on Information and Communication Technology Convergence* (*ICTC*). IEEE, Dec. 7, 2021. pp.
(Continued)

*Primary Examiner* — Trang U Tran
(74) *Attorney, Agent, or Firm* — NSIP Law

(57) ABSTRACT

The present invention relates to an image collection sensor device, an unmanned counting edge computing system and method using the same, and more particularly, to an image collection sensor device capable of providing a high-precision unmanned counting service using a low-power wireless image collection sensor device operated by a battery by analyzing unmanned counting result data that counts the number of persons included in image data, determining image sensor parameters of the image data, and adjusting a collection cycle and collection image quality of image sensor data according to environmental changes in a sensing area.

14 Claims, 10 Drawing Sheets

(51) Int. Cl.

| | |
|---|---|
| ***G06T 7/60*** | (2017.01) |
| ***G06T 7/70*** | (2017.01) |
| ***G06V 10/77*** | (2022.01) |
| ***G06V 20/52*** | (2022.01) |
| ***G06V 40/16*** | (2022.01) |
| ***H04N 7/18*** | (2006.01) |

(52) U.S. Cl.
CPC .............. *G06V 10/77* (2022.01); *G06V 20/52* (2022.01); *G06V 40/161* (2022.01); *H04N 7/183* (2013.01); *G06T 2207/30168* (2013.01); *G06T 2207/30201* (2013.01); *G06T 2207/30242* (2013.01)

(58) Field of Classification Search
CPC ..................... G06T 7/0002; G06T 7/60; G06T 2207/30168; G06T 2207/30201; G06T 2207/30242
USPC .......................................................... 348/143
See application file for complete search history.

(56) References Cited

U.S. PATENT DOCUMENTS

| | | | | |
|---|---|---|---|---|
| 11,055,878 | B2 * | 7/2021 | Yi | G06V 10/761 |
| 2012/0158297 | A1 | 6/2012 | Kim et al. | |
| 2021/0191975 | A1 * | 6/2021 | Lu | G06F 16/583 |

FOREIGN PATENT DOCUMENTS

| | | | |
|---|---|---|---|
| KR | 10-2398466 | B1 | 5/2022 |
| KR | 10-2023-0166410 | A | 12/2023 |

OTHER PUBLICATIONS

Kim, Ryangsoo, et al. “Accelerating Face De-identification System for Real-time Video Surveillance Services.” *2022 13th International Conference on Information and Communication Technology Convergence (ICTC)*. IEEE, Nov. 25, 2022. pp. 1.

* cited by examiner

IMAGE COLLECTION SENSOR DEVICE, UNMANNED COUNTING EDGE COMPUTING SYSTEM AND METHOD USING THE SAME

This application claims the benefit under 35 USC § 119(a) of Korean Patent Application No. 10-2022-0152876 filed on Nov. 15, 2022, in the Korean Intellectual Property Office, the entire disclosure of which is incorporated herein by reference for all purposes.

BACKGROUND

1. Field of the Invention

The present invention relates to an image collection sensor device, an unmanned counting edge computing system and method using the same, and more particularly, to an image collection sensor device capable of providing a high-precision unmanned counting service using a low-power wireless image collection sensor device operated by a battery by analyzing unmanned counting result data that counts the number of persons included in image data, determining image sensor parameters of the image data, and adjusting a collection cycle and collection image quality of image sensor data according to environmental changes in a sensing area.

2. Discussion of Related Art

An unmanned counting system is a system that automatically counts the number of persons entering and exiting a specific place, and has been installed at entrances of institutions, event venues, and the like requiring visitor management to count the number of persons entering and exiting.

The conventional unmanned counting system has mainly used a local computing method that creates a deep learning inference engine by using a low-power artificial intelligence (AI) chip capable of processing deep learning calculations in a sensor unit that acquires images, and detects a person or face in an image through the deep learning inference engine.

However, in order to build an unmanned counting system of the local computing method, an AI chip for performing the calculation of the deep learning inference engine needs to be mounted on all image collection sensor devices, which increases the unit cost of an image collection sensor device.

When a low-cost AI chip is installed and used to reduce the unit cost of the image collection sensor device, due to limitations of processing performance of an AI chip, an inference engine is created using a lightweight deep learning model that is less accurate but capable of a fast calculation instead of using a deep learning model that detects a person or face with high accuracy to perform person and face detection in an image for persons counting, so inaccurate unmanned counting results are caused in an environment where the number of objects (persons or faces) in the image is large or sizes of the objects vary.

In addition, in the conventional method in which the AI chip is embedded in all image collection sensor devices, since the AI chip mounted on the corresponding sensor device is not used in a situation where there is no person to count in an image, the AI chip mounted in the sensor device is not used, so a usage rate of the AI chip decreases, resulting in inefficient waste of resources.

A deep learning inference offloading technology using edge computing is attracting attention as a method of providing high-precision deep learning model inference service while minimizing such inefficient waste of resources.

The edge computing is a low-latency deep learning data analysis technology that causes a computing server to be arranged adjacent to sensors collecting field data and a network to reduce network latency consumed when using cloud computing, resulting in enabling fast deep learning-based data processing.

In the edge computing environment, deep learning offloading service transfers data collected from remote sensors to the edge computing server through a wireless network, and creates a deep learning inference engine using calculation resources of the edge computing server to collect sensing data collected in the field and perform data analysis processing using a deep learning model with low latency on sensing data collected in the field.

When deep learning offloading technology is applied in an edge computing environment, a sensor device that collects image data can be manufactured with a low-cost, low-power structure that does not use an AI chip. However, an operation of the sensor device requesting deep learning offloading by wirelessly transmitting image data is another cause of power consumption of a wireless sensor device operating with a limited battery.

In particular, transmitting a deep learning offloading request message at regular cycles to provide high-precision unmanned counting service in real time even in an environment where there is no person to count in the image captured by the wireless image collection sensor device is one of the main causes of meaningless power consumption.

In order to minimize such power consumption, a technology for determining whether to transmit a deep learning offloading request message according to whether there is no person to count in an area captured by a wireless image collection sensor is required.

In addition, the counting accuracy in the method of providing unmanned counting service through the deep learning inference offloading technology is proportional to the accuracy of the deep learning model used to detect persons included in the capturing area. Always detecting a person using a high-precision deep learning model regardless of the counting environment within the area captured by the wireless image collection sensor causes an inefficient unmanned counting system operation.

In particular, a deep learning model that detects a person has a characteristic in which detection ability of the model is proportional to the input image size. In order to request high-precision deep learning model offloading at every counting point, large-sized image data should be transmitted from the wireless image collection sensor, resulting in power consumption.

Therefore, in order to minimize the power consumption of the wireless image collection sensor device, a counting situation adaptive deep learning offloading image size determination technology needs to change the input size of the deep learning model that detects persons according to the persons counting environment of the area captured by the sensor to minimize power consumption while maintaining the accuracy of the unmanned counting system.

SUMMARY OF THE INVENTION

In order to overcome the above-mentioned disadvantages of the related art, the present invention provides an image collection sensor device capable of providing a high-precision unmanned counting service using a low-power wireless image collection sensor device operated by a battery by analyzing unmanned counting result data that counts the number of persons included in image data, determining image sensor parameters of the image data, and adjusting a collection cycle and collection image quality of image sensor data according to environmental changes within a sensing area, and an unmanned counting edge computing system and method using the same.

An aspect of the present invention is not limited to the above-described aspect. That is, other aspects that are not described may be obviously understood by those skilled in the art from the following specification.

In an aspect of the present invention, an image collection sensor device includes: a camera module configured to collect and encode image data through a camera; a communication module configured to transmit the image data collected from the camera module to a wireless gateway device and receive unmanned counting result data, in which the number of persons included in the image data is counted, from the wireless gateway device; and a sensor control module configured to analyze the received unmanned counting result data to determine image sensor parameters of the image data collected from the camera module, and control the camera module or the communication module according to the image sensor parameter.

The unmanned counting result data may further include face position information and face size information of a person in the image data, and the communication module may include an unmanned counting result receiving unit configured to receive the unmanned counting result data from the wireless gateway device.

The image sensor parameter may include a collection cycle of the image data and a collection image quality of the image data, and the sensor control module may include an image sensor parameter determination unit configured to determine a collection cycle of the image data from information on the number of persons in the image data, and to determine the collection image quality of the image data from the face size information of the person in the image data.

The communication module may further include an offloading request transmitting unit configured to transmit image data encoded in the camera module, unmanned counting result data in previous image data, image sensor parameters determined from unmanned counting result data in the previous image data, and offloading request data including a deep learning inference request flag to the wireless gateway device.

The sensor control module may further include a control unit configured to control the camera module to collect the image data according to the collection cycle of the image data and encode the collected image data according to a collection image quality of the image data, and control the offloading request transmitting unit to transmit the image data encoded according to the collection image quality of the image data to the wireless gateway device.

When transmitting the offloading request data, the offloading request transmitting unit may periodically transmit a high-precision deep learning inference request flag according to a predetermined high-precision deep learning inference request cycle.

In another aspect of the present invention, an unmanned counting edge computing system includes: an image collection sensor device configured to collect and encode image data through a camera, and analyze unmanned counting result data in which the number of persons included in the image data is counted to determine image sensor parameters of the image data; a wireless gateway device configured to receive the image data, unmanned counting result data in previous image data, image sensor parameters determined from unmanned counting result data in the previous image data, and offloading request data including a deep learning inference request flag from the image collection sensor device and transmit the image data, the unmanned counting result data, the image sensor parameter, and the offloading request data; and an edge computing server configured to perform deep learning inference according to the offloading request data received from the wireless gateway device to count the number of persons included in the image data included in the offloading request data and derive the unmanned counting result data.

The unmanned counting result data may further include face position information and face size information of a person in the image data, and the image collection sensor device may receive the unmanned counting result data from the wireless gateway device.

The image sensor parameter may include a collection cycle of the image data and a collection image quality of the image data, and the image collection sensor device may determine a collection cycle of the image data from information on the number of persons in the image data, determine the collection image quality of the image data from face size information of a person in the image data, determine a collection cycle of the image data, control to collect the image data according to the collection cycle of the image data, and encode the collected image data according to the collection image quality of the image data, and may transmit the image data encoded according to the collection image quality of the image data to the wireless gateway device, and the edge computing server may receive the image data collected and encoded according to the collection cycle of the image data through the wireless gateway device, and perform deep learning inference according to the offloading request data to count the number of persons included in the image data included in the offloading request data and derive the unmanned counting result data.

The edge computing server may include an offloading request receiving unit configured to receive the offloading request data transmitted from the wireless gateway device, a deep learning inference calculation unit configured to select a deep learning model corresponding to the offloading request data, and drive an inference engine of the selected deep learning model to count the number of persons included in the image data included in the offloading request data and derive the unmanned counting result data; and an unmanned counting result transmitting unit configured to transmit the unmanned counting result data to the image collection sensor device.

The deep learning inference calculation unit may include: a deep learning model selection unit configured to select a deep learning model corresponding to the offloading request data; a deep learning inference pre-processing unit configured to perform preprocessing of the image data in order to perform an inference calculation of the deep learning model; a deep learning inference engine unit configured to perform an inference calculation of the deep learning model; and a deep learning inference post-processing unit configured to post-process an inference calculation result value of the deep learning model to derive the unmanned counting result data.

In still another aspect of the present invention, an unmanned counting edge computing method includes: collecting image data through a camera in an image collection sensor device; receiving, by an edge computing server, the image data, unmanned counting result data in previous image data, image sensor parameters determined from unmanned counting result data in the previous image data, and offloading request data including a deep learning inference request flag from the image collection sensor device through a wireless gateway device; performing, by the edge computing server, deep learning inference according to the offloading request data to count the number of persons included in the image data included in the offloading request data and derive the unmanned counting result data; receiving, by the image collection sensor device, unmanned counting result data, in which the number of persons included in the image data is counted, through the wireless gateway device; and analyzing, by the image collection sensor device, the unmanned counting result data to determine image sensor parameters of the image data.

The unmanned counting result data may further include face position information and face size information of a person in the image data.

The image sensor parameter may include a collection cycle of the image data and a collection image quality of the image data, and the determining of the image sensor parameter of the image data may include: determining, by the image collection sensor device, a collection cycle of the image data from information on the number of persons in the image data; determining a collection image quality of the image data from the face size information of a person in the image data; controlling to collect the image data according to the collection cycle of the image data and encode the collected image data according to the collection image quality of the image data; and transmitting the image data encoded according to the collection image quality of the image data to the wireless gateway device, and the deriving of the unmanned counting result data may include: receiving, by the edge computing server, the image data collected and encoded according to the collection cycle of the image data through the wireless gateway device; and performing deep learning inference according to the offloading request data to count the number of persons included in the image data included in the offloading request data and derive the unmanned counting result data.

The performing of the deep learning inference according to the offloading request data to count the number of persons included in the image data included in the offloading request data and derive the unmanned counting result data may include: selecting, by the edge computing server, a deep learning model corresponding to offloading request; performing pre-processing of the image data to perform an inference calculation of the deep learning model; performing the inference calculation of the deep learning model; and post-processing an inference calculation result value of the deep learning model to derive the unmanned counting result data.

DETAILED DESCRIPTION OF EXEMPLARY EMBODIMENTS

Figure 1:
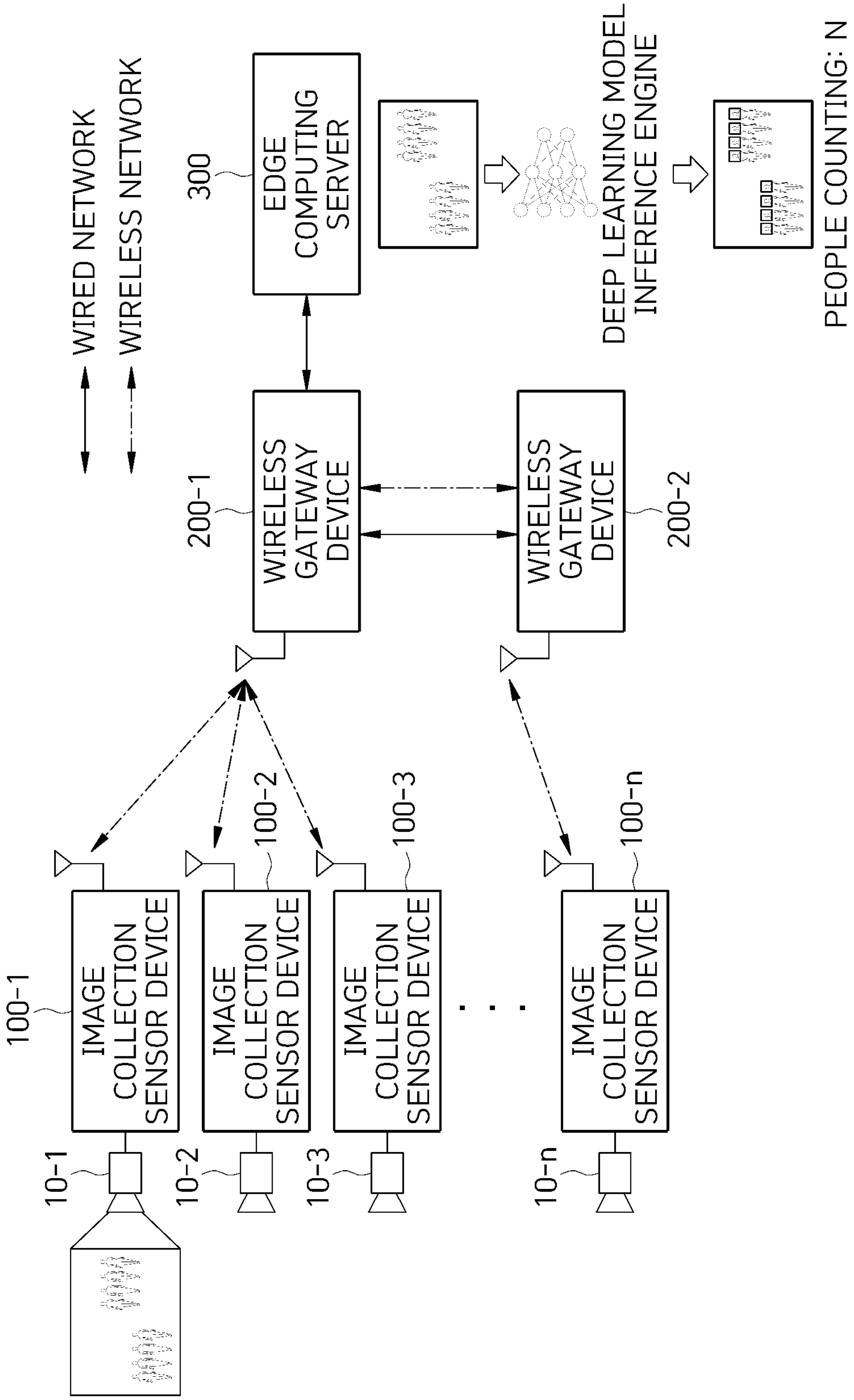
FIG. 1 is a diagram illustrating a first implementation example of an unmanned counting edge computing system to which an image collection sensor device according to an embodiment of the present invention may be applied.

Various advantages and features of the present invention and methods accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. Components, steps, operations, and/or elements mentioned by terms “comprise” and/or “comprising” used in the present disclosure do not exclude the existence or addition of one or more other components, steps, operations, and/or elements.

When it is decided that the detailed description of the known art related to the present invention may unnecessary obscure the gist of the present invention, a detailed description therefor will be omitted.

Hereinafter, embodiments of the present disclosure will be described in detail with reference to the accompanying drawings. The same means will be denoted by the same reference numerals throughout the accompanying drawings in order to facilitate the general understanding of the present invention in describing the present invention.

FIG. 1 is a diagram illustrating a first implementation example of an unmanned counting edge computing system to which an image collection sensor device according to an embodiment of the present invention may be applied.

Referring to FIG. 1, a plurality of image collection sensor devices 100-1, 100-2, 100-3, . . . , 100-*n* may be connected to an edge computing server 300 through wireless gateway devices 200-1 and 200-2 to exchange data. The image collection sensor devices 100-1, 100-2, 100-3, . . . , 100-*n* collect image data from cameras 10-1, 10-2, 10-3, . . . , 10-*n*, and transmit the collected image data to the wireless gateway devices 200-1 and 200-2 through a wireless network, and to the edge computing server connected to the wireless gateway devices 200-1 and 200-2 by wire, and the edge computing server 300 performs unmanned counting service in a way to use the transmitted image data as input data to the deep learning inference engine, and then count persons in the image data through driving of the deep learning inference engine. In one embodiment, the image collection sensor devices 100-1, 100-2, 100-3, . . . , 100-*n* may be wireless devices that transmit and receive data wirelessly, but are not limited thereto.

Figure 2:
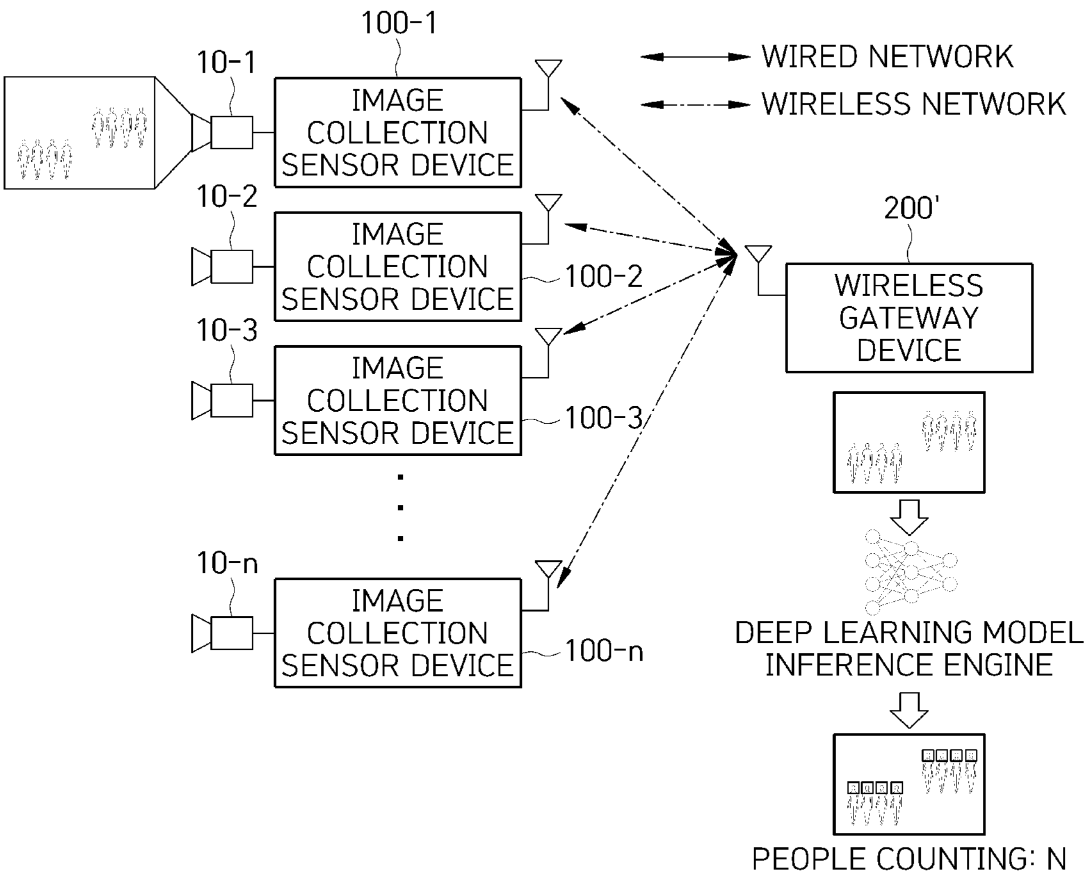
FIG. 2 is a diagram illustrating a second implementation example of an unmanned counting edge computing system to which an image collection sensor device according to an embodiment of the present invention may be applied.

FIG. 2 is a diagram illustrating a second implementation example of an unmanned counting edge computing system to which an image collection sensor device according to an embodiment of the present invention may be applied.

Referring to FIG. 2, an unmanned counting edge computing system in the case where an edge computing function is mounted in a wireless gateway device 200' is illustrated. In order to build a system as illustrated in FIG. 2, hardware acceleration devices (GPU, FPGA, AI dedicated chip, etc.) capable of performing deep learning calculations should be installed in the wireless gateway device 200'. In this case, the wireless gateway device 200' directly counts persons in the image data by driving a deep learning inference engine.

Figure 3:
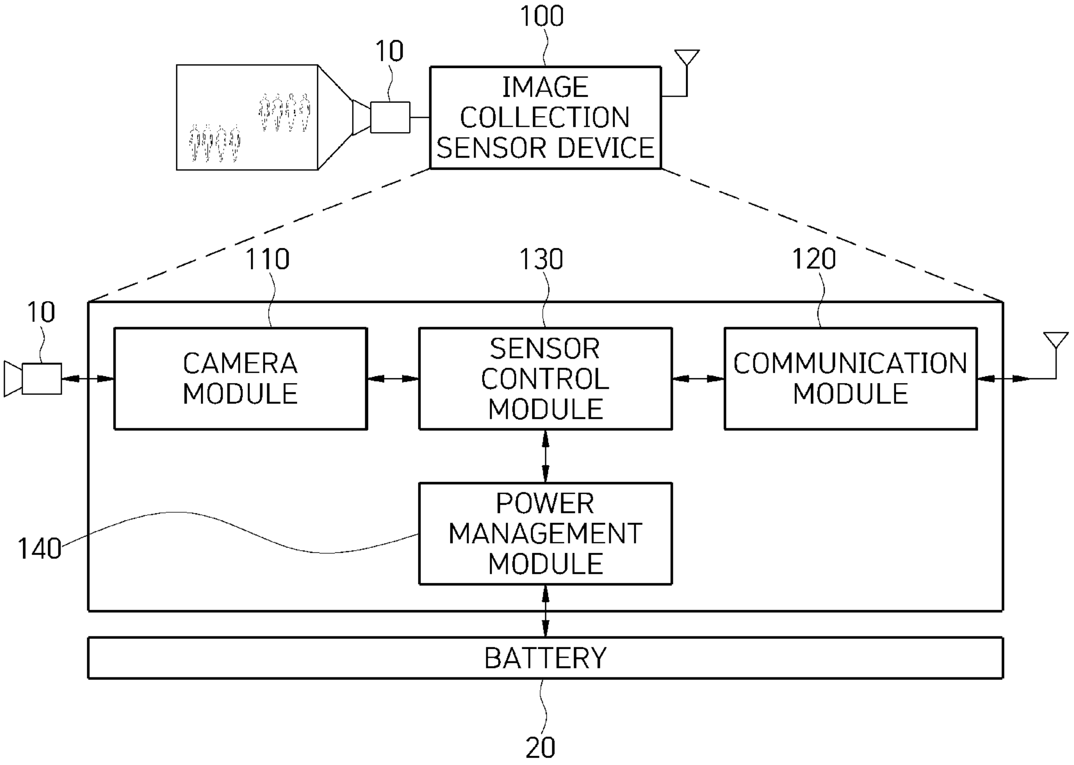
FIG. 3 is a diagram schematically illustrating a configuration of an image collection sensor device according to an embodiment of the present invention.

FIG. 3 is a diagram schematically illustrating a configuration of an image collection sensor device according to an embodiment of the present invention.

Referring to FIG. 3, an image collection sensor device 100 according to an embodiment of the present invention includes a camera module 110, a communication module 120, a sensor control module 130, and a power management module 140. The image collection sensor device 100 illustrated in FIG. 1 is according to an embodiment, and components of the image collection sensor device 100 according to the present invention are not limited to the embodiment illustrated in FIG. 1, but may be added, changed or deleted, if necessary.

The camera module 110 may collect and encode image data through the camera 10. In one embodiment, the camera module 110 may collect image data through the camera 10 according to a command of the sensor control module 130 and encode the collected image data in a format such as Joint Photographic Experts Group (JPEG).

The communication module 120 is connected to the wireless gateway device 200 and performs a function of transmitting and receiving data. In an embodiment, the communication module 120 may transmit the image data collected from the camera module 110 to the wireless gateway device 200, and receive unmanned counting result data, in which the number of persons included in the image data is counted, from the wireless gateway device 200. In one embodiment, the unmanned counting result data may further include face position information and face size information of a person in the image data in addition to the number of persons included in the image data.

The sensor control module 130 analyzes the received unmanned counting result data to determine image sensor parameters of the image data collected from the camera module 110, and controls the camera module 110 or communication module 120 according to image sensor parameters. In one embodiment, the image sensor parameter is a parameter for controlling other modules, and may include a collection cycle and collection image quality of image data. Also, the image sensor parameters may include parameters related to JPEG encoding, and thus the camera module 110 may perform JPEG encoding. The sensor control module 130 may collect information related to the battery 20 from the power management module 140.

The power management module 140 serves to supply necessary power to each module from the rechargeable battery 20 mounted in the image collection sensor device 100 and monitor the consumption of the battery 20. In one embodiment, the power management module 140 may supply power to one or more of the camera module 110, the communication module 120, and the sensor control module 130 from the battery 20 and monitor the consumption of the battery 20.

Hereinafter, a configuration of the image collection sensor device according to an embodiment of the present invention will be described in more detail with reference to FIG. 4.

Figure 4:
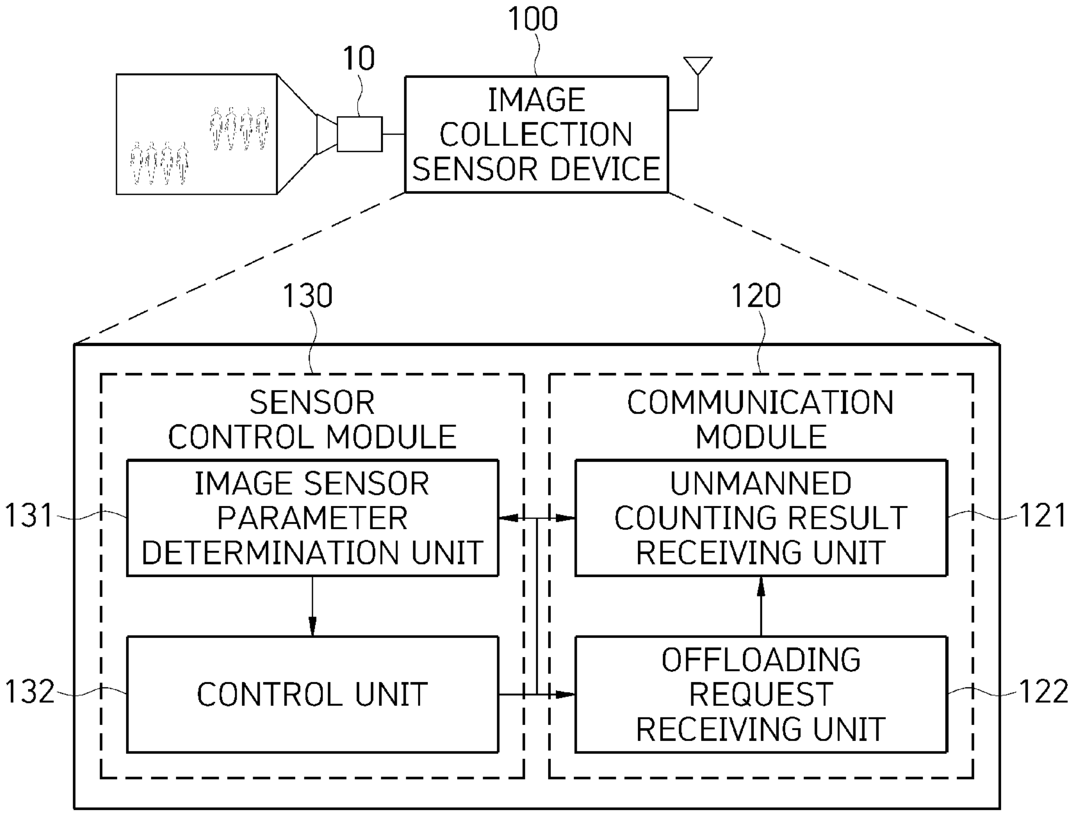
FIG. 4 is a diagram illustrating in more detail the configuration of the image collection sensor device according to the embodiment of the present invention.

FIG. 4 is a diagram illustrating in more detail the configuration of the image collection sensor device according to the embodiment of the present invention.

Referring to FIG. 4, the detailed configurations of the communication module 120 and the sensor control module 130 of the image collection sensor device 100 according to the embodiment of the present invention are illustrated. The communication module 120 may include an unmanned counting result receiving unit 121 and an offloading request transmitting unit 122, and the sensor control module 130 may include an image sensor parameter determination unit 131 and a control unit 132.

The unmanned counting result receiving unit 121 receives unmanned counting result data from the wireless gateway device 200. In one embodiment, the unmanned counting result receiving unit 121 serves to receive unmanned counting result data derived as a result of performing deep learning inference calculation in the remote edge computing server 300 through the wireless gateway device 200. The unmanned counting result data includes the number of persons in the image data collected by the image collection sensor device 100, and face position information and face size information of persons in the image data.

The offloading request transmitting unit 122 serves to transmit the collected image data to the remote edge computing server 300 through the wireless gateway device 200. In one embodiment, the offloading request transmitting unit 122 may transmit image data encoded in the camera module, unmanned counting result data in previous image data, image sensor parameters determined from unmanned counting result data in the previous image data, and offloading request data including a deep learning inference request flag to the wireless gateway device 200.

The image sensor parameter determination unit 131 serves to receive the unmanned counting result data to determine the image collection cycle of the image collection sensor device 100 and the collection image quality (image size 320×320, 640×640, etc.) of image data transmitted from the offloading request transmitting unit 122. In one embodiment, the image sensor parameter determination unit 131 may determine the collection cycle of the image data from information on the number of persons in the image data, and the collection image quality of the image data from face size information of a person in the image data.

The control unit 132 controls the camera module 110 to collect the image data according to the collection cycle of the image data and encode the collected image data according to the collection image quality of the image data, and control the offloading request transmitting unit 122 to transmit the encoded image data to the wireless gateway device 200 according to the collection image quality of the image data.

Hereinafter, referring to FIG. 5, the structure in which the image sensor parameter determination unit 131 of the image collection sensor device 100 according to the embodiment of the present invention determines the image sensor parameters including the collection cycle and collection image quality of the image data will be described.

Figure 5:
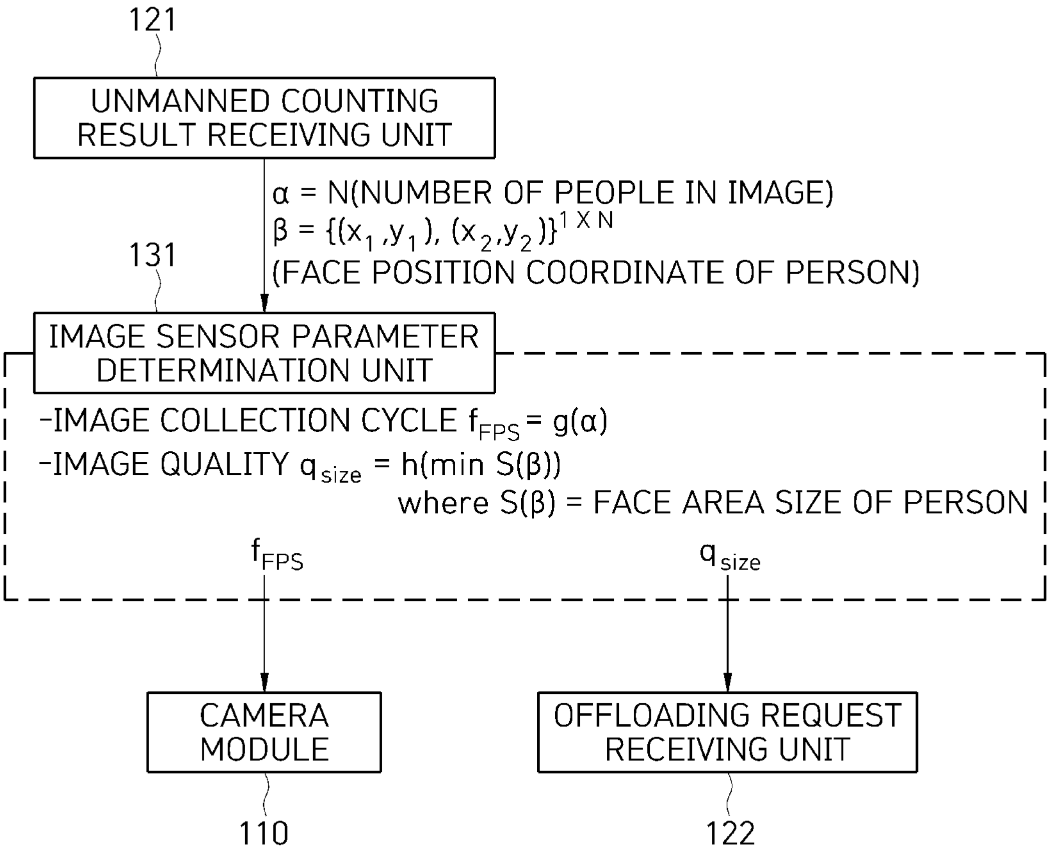
FIG. 5 is a diagram illustrating a structure of determining image sensor parameters in the image collection sensor device according to the embodiment of the present invention.

FIG. 5 is a diagram illustrating a structure of determining image sensor parameters in the image collection sensor device according to the embodiment of the present invention.

Referring to FIG. 5, the unmanned counting result receiving unit 121 receives the unmanned counting result data from the wireless gateway device 200, and the image sensor parameter determination unit 131 determines the collection cycle of the image data and the collection image quality of the image data. The collection cycle of the image data is determined according to the number of persons included in the previous image data, and the collection image quality of the image data is determined according to the minimum face size information among human faces included in the previous image data. For example, as the number of persons included in the previous image data increases, the change in the number of persons in the image data increases, so the collection cycle of the image data may decrease. Also, the smaller the minimum face size among human faces included in the previous image data, the larger the collection image quality of the image data, that is, the larger the size.

Figure 6:
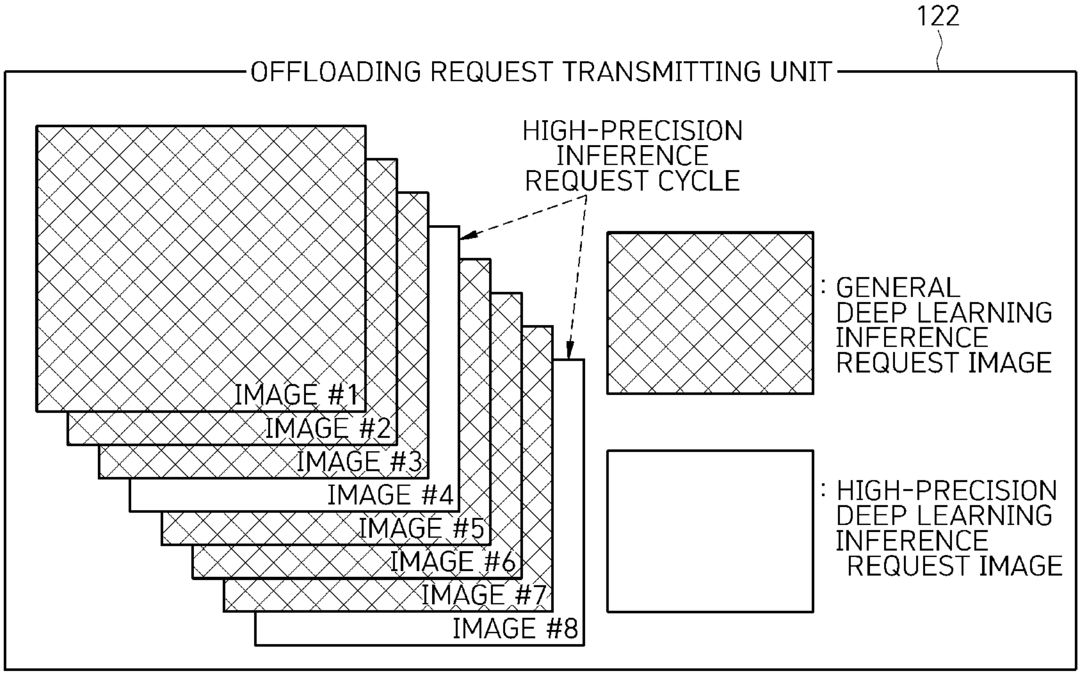
FIG. 6 is a diagram illustrating a function of periodically requesting high-precision deep learning inference in an offloading request transmitting unit of the image collection sensor device according to an embodiment of the present invention.

FIG. 6 is a diagram illustrating a function of periodically requesting high-precision deep learning inference in an offloading request transmitting unit of the image collection sensor device according to an embodiment of the present invention.

Referring to FIG. 6, the offloading request transmitting unit 122 of the image collection sensor device 100 according to the embodiment of the present invention may periodically transmit a high-precision deep learning inference request flag according to a predetermined high-precision deep learning inference request period when transmitting offloading request data. In one embodiment, the offloading request transmitting unit 122 may transmit the high-precision deep learning inference request flag to the edge computing server 300 by including the high-precision deep learning inference request flag in the offloading request data according to the high-precision deep learning inference request period. The offloading request transmitting unit 122 may periodically transmit the offloading request data including the high-precision deep learning inference request flag to complement the information missed in the previous image unmanned coefficient analysis results and adjust image sensor parameters such as the request to use the deep learning model, the collection cycle of the image data, and the collection image quality of the image data, etc., when requesting the deep learning inference in the future, thereby implementing context awareness-based unmanned counting system. A predetermined high-precision deep learning inference request cycle may be appropriately set by a user in order to increase the accuracy of unmanned counting.

Figure 7A:
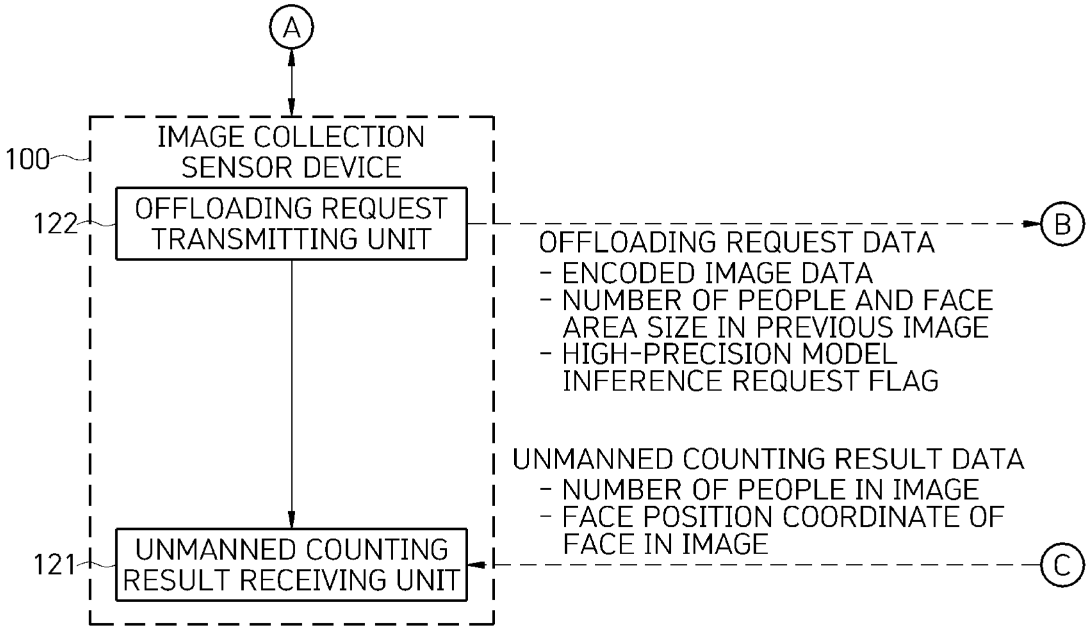
FIGS. 7A and 7B are diagrams illustrating a configuration of an edge computing system using the image collection sensor device according to the embodiment of the present invention.
Figure 7B:
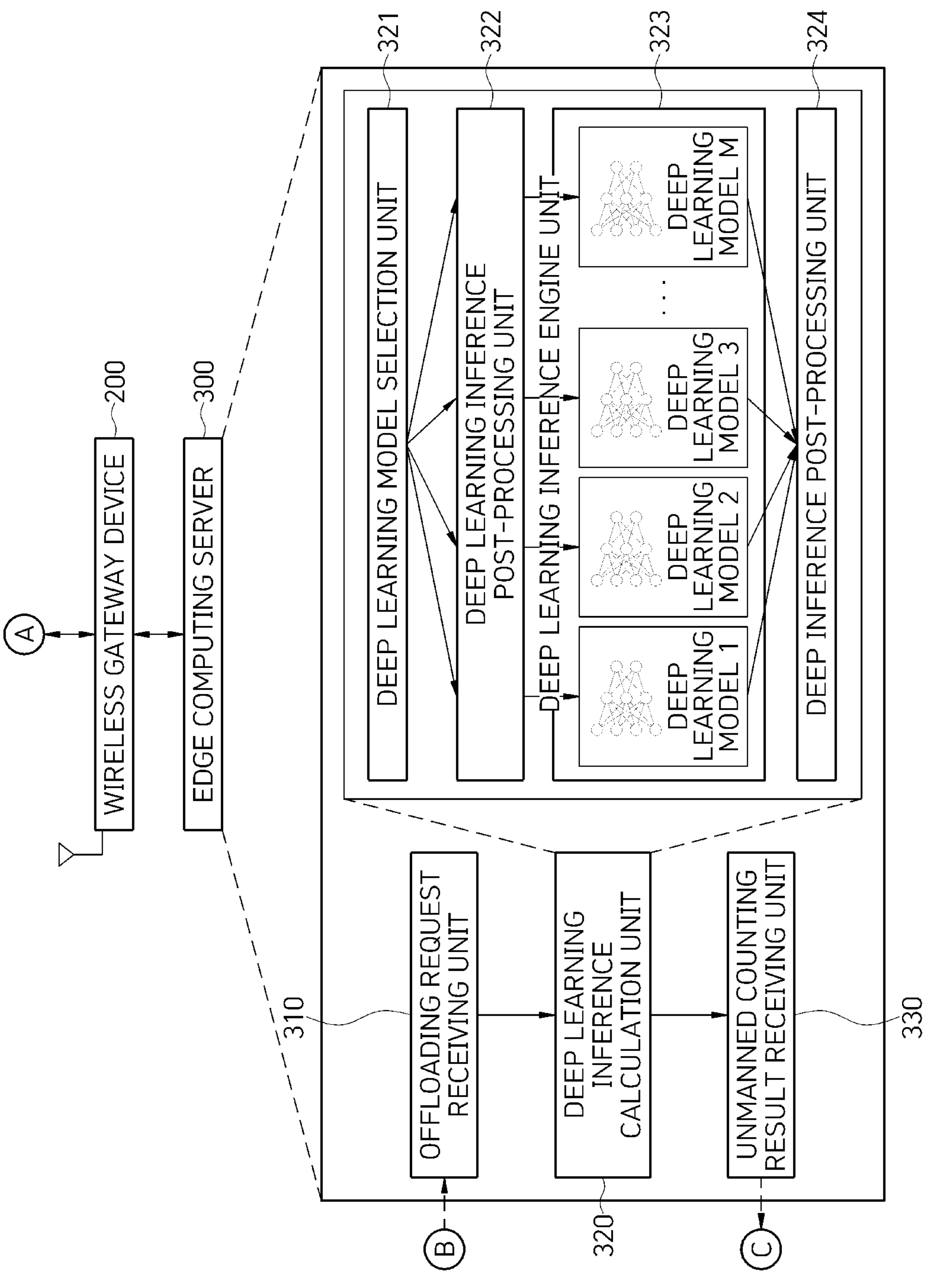

FIG. 7 is a diagram illustrating a configuration of an edge computing system using the image collection sensor device according to the embodiment of the present invention.

Referring to FIG. 7, an edge computing system using an image collection sensor device according to an embodiment of the present invention includes the image collection sensor device 100, the wireless gateway device 200, and the edge computing server 300. As described in FIG. 2, when the edge computing function is mounted in the wireless gateway device 200, the wireless gateway device 200 may be configured to include the edge computing server 300.

The image collection sensor device 100 collects and encodes the image data through the camera, and analyzes the unmanned counting result data, in which the number of persons included in the image data is counted, to determine image sensor parameters of the image data.

In one embodiment, the unmanned counting result data may further include face position information and face size information of a person in the image data in addition to the number of persons included in the image data. Also, the image collection sensor device 100 may receive the unmanned counting result data from the wireless gateway device 200.

Also, the image sensor parameters may include the collection cycle of the image data and the collection image quality of the image data. The image collection sensor device 100 may determine a collection cycle of the image data from information on the number of persons in the image data, determine the collection image quality of the image data from the face size information of a person in the image data, determine the collection cycle of the image data, control to collect the image data according to the collection cycle of the image data and encode the collected image data according to the collection image quality of the image data, and may transmit the image data encoded according to the collection image quality of the image data to the wireless gateway device.

The configuration and function of the image collection sensor device 100 have been described with reference to FIGS. 1 to 6, and since the configuration and function are applied to FIG. 7 as they are, a detailed description thereof will be omitted.

The wireless gateway device 200 receives the image data, the unmanned counting result data in the previous image data, the image sensor parameter determined from unmanned counting result data in the previous image data, and the offloading request data including the deep learning inference request flag from the image collection sensor device 100 and transmits the image data, the unmanned counting result data, the image sensor parameter, and the offloading request data.

The edge computing server 300 performs the deep learning inference according to the offloading request data received from the wireless gateway device 200, counts the number of persons included in the image data included in the offloading request data, and derives the unmanned counting result data. In one embodiment, the edge computing server 300 may be configured to include an offloading request receiving unit 310, a deep learning inference calculation unit 320, and an unmanned counting result transmitting unit 330.

The offloading request receiving unit 310 receives offloading request data transmitted from the wireless gateway device 200.

The deep learning inference calculation unit 320 serves to select the optimal deep learning model from the offloading request data received from the offloading request receiving unit 310 and drives the inference engine of the deep learning model to derive the unmanned counting result data. In one embodiment, the deep learning inference calculation unit 320 selects a deep learning model corresponding to the offloading request data, and drives an inference engine of the selected deep learning model to count the number of persons included in the image data included in the offloading request data and derive the unmanned counting result data. In one embodiment, the deep learning inference calculation unit 320 may be configured to include a deep learning model selection unit 321 that selects the deep learning model corresponding to the offloading request data, a deep learning inference pre-processing unit 322 that performs pre-processing on image data to perform inference calculation of the deep learning model, a deep learning inference engine unit 323 that performs the inference calculation of the deep learning model, and a deep learning inference post-processing unit 324 that post-processes the inference calculation result of the deep learning model to derive the unmanned counting result data.

The unmanned counting result transmitting unit 330 transmits the unmanned counting result data to the image collection sensor device 100.

As described above with reference to FIGS. 1 to 7, according to an image collection sensor device and an edge computing system using the same according to an embodiment of the present invention, by analyzing the unmanned counting result data, in which the number of persons included in the image data is counted, to determine the image sensor parameters of the image data and adjust the collection cycle and collection image quality of the image sensor data according to the environmental change in the sensing area, a high-precision unmanned counting service may be provided by using a low-power wireless image collection sensor device operated by a battery.

Hereinafter, the change in accuracy of the face detection results according to the changes in the deep learning model or the collection image quality of the image data in the image collection sensor device and the edge computing system using the same according to an embodiment of the present invention will be described below with reference to FIGS. 8 to 10.

Figure 8:
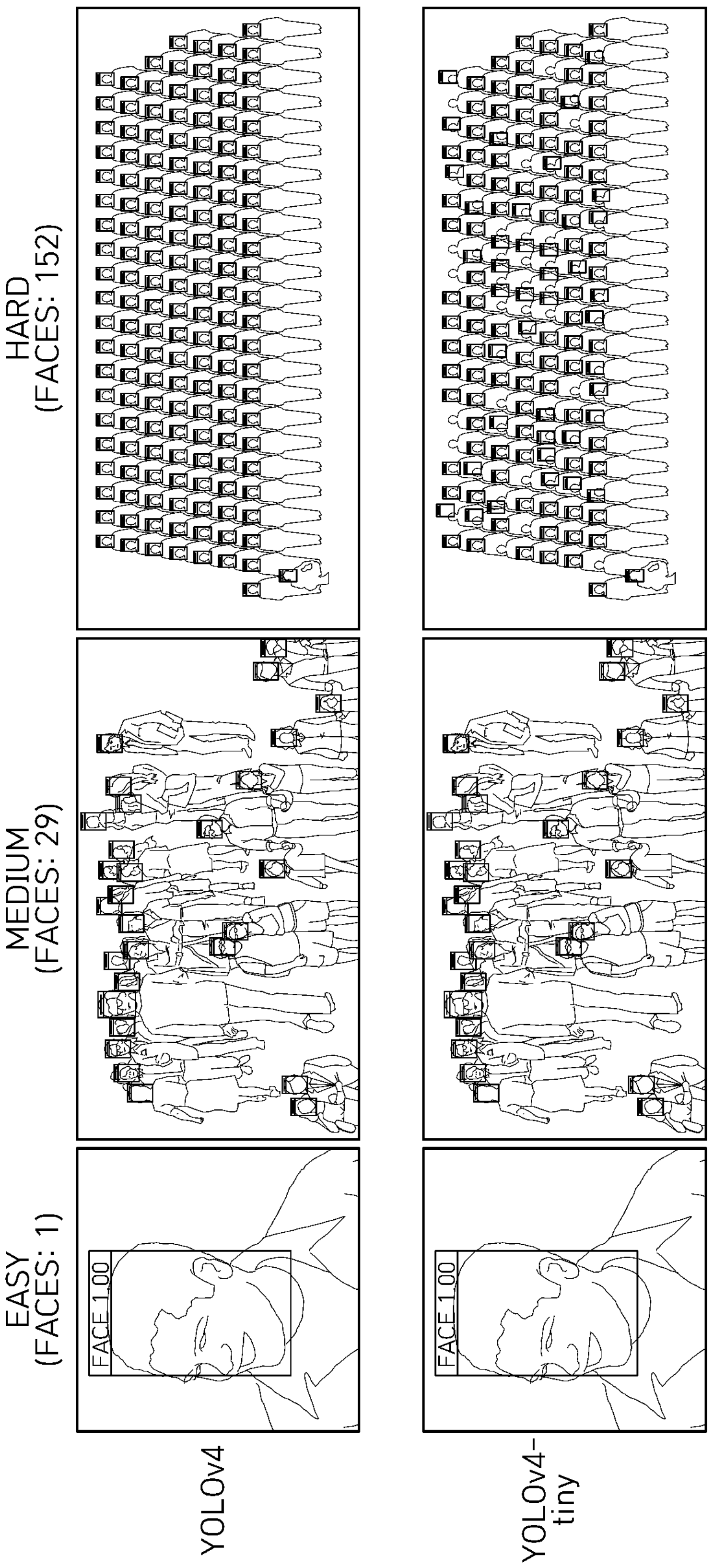
FIG. 8 is a diagram for describing a change in accuracy of face detection results for each deep learning model according to an unmanned counting environment in image data.

FIG. 8 is a diagram for describing a change in accuracy of face detection results for each deep learning model according to an unmanned counting environment in image data.

Referring to FIG. 8, it is possible to show the accuracy of detection results for each face detection deep learning model according to the change in the unmanned counting environment (face size and the number of persons) in image data. A Yolov4-based face detection model is a deep learning model that requires a lot of computation, and a Yolov4-tiny-based face detection model is a deep learning model that requires less computation than the Yolov4-based face detection model. As can be seen from FIG. 8, there is no significant difference in the face detection accuracy between the two models when the face size in the image data is large or the number of persons is small (Easy and Medium). However, as in the two images on the right, when the face size is small or the number of persons is large (hard), the difference in accuracy may occur.

Figure 9:
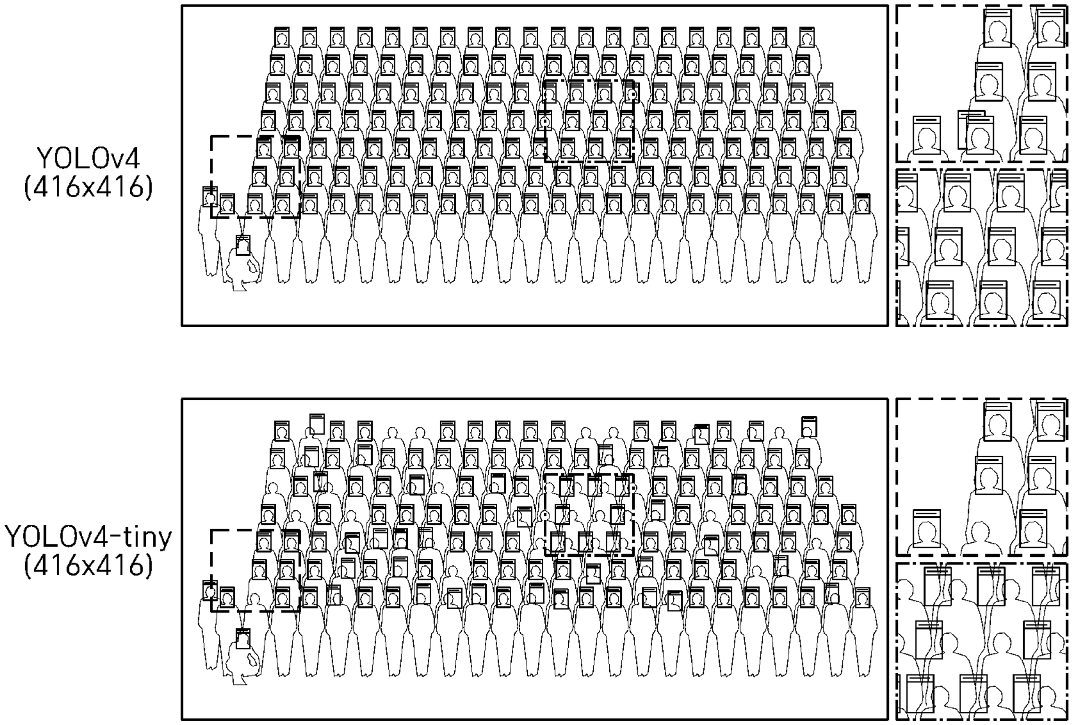
FIG. 9 is a diagram for describing a change in accuracy of face detection results for each deep learning model when a size of face in image data is small or the number of persons is large.

FIG. 9 is a diagram for describing a change in accuracy of face detection results for each deep learning model when a size of face in image data is small or the number of persons is large.

Referring to FIG. 9, it can be seen that the Yolov4-based face detection model relatively accurately detected a human face when the face size in the image data is small or the number of persons is large, but the Yolov4-tiny-based face detection model shows that some faces are not properly detected.

Therefore, in the image collection sensor device and the edge computing system using the same according to the embodiment of the present invention, the deep learning model selection unit 321 may select the deep learning model corresponding to the number of persons in the unmanned counting result data in the previous image data included in the offloading request data. For example, the deep learning model selection unit 321 may select the Yolov4-tiny-based face detection model as the deep learning model when the number of persons in the previous image data is less than a predetermined number, and select the Yolov4-based face detection model as the deep learning model when the number of persons is greater than or equal to a predetermined number.

Figure 10:
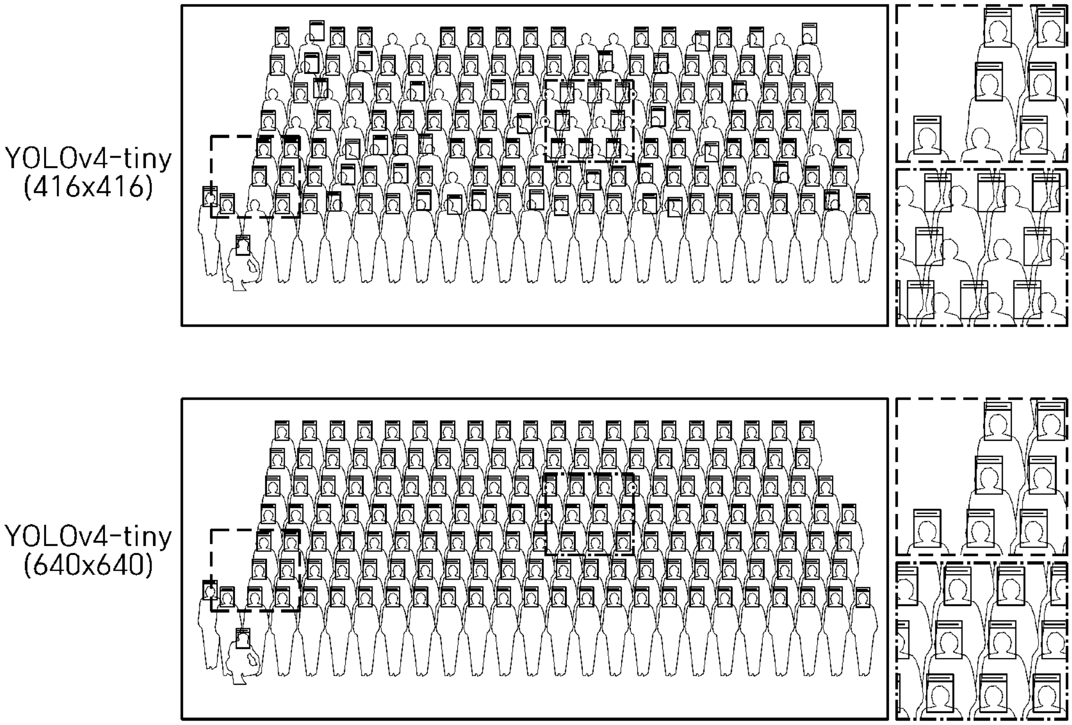
FIG. 10 is a diagram for describing a change in accuracy of face detection results for each deep learning model according to a difference in image quality of an input image.

FIG. 10 is a diagram for describing a change in accuracy of face detection results for each deep learning model according to a difference in image quality of an input image.

Referring to FIG. 10, in the deep learning model for face detection with improved face detection accuracy but increased computational complexity as the size of the input image data increases, it can be seen that there is a difference in face detection accuracy as the size of the input image data increases (416×416, 640×640).

Therefore, in the image collection sensor device and the edge computing system using the same according to the embodiment of the present invention, the image sensor parameter determination unit 131 may improve the accuracy of the face detection by greatly adjusting the collection image quality of the image data as the minimum face size among human faces in the previous image data decreases.

Figure 11:
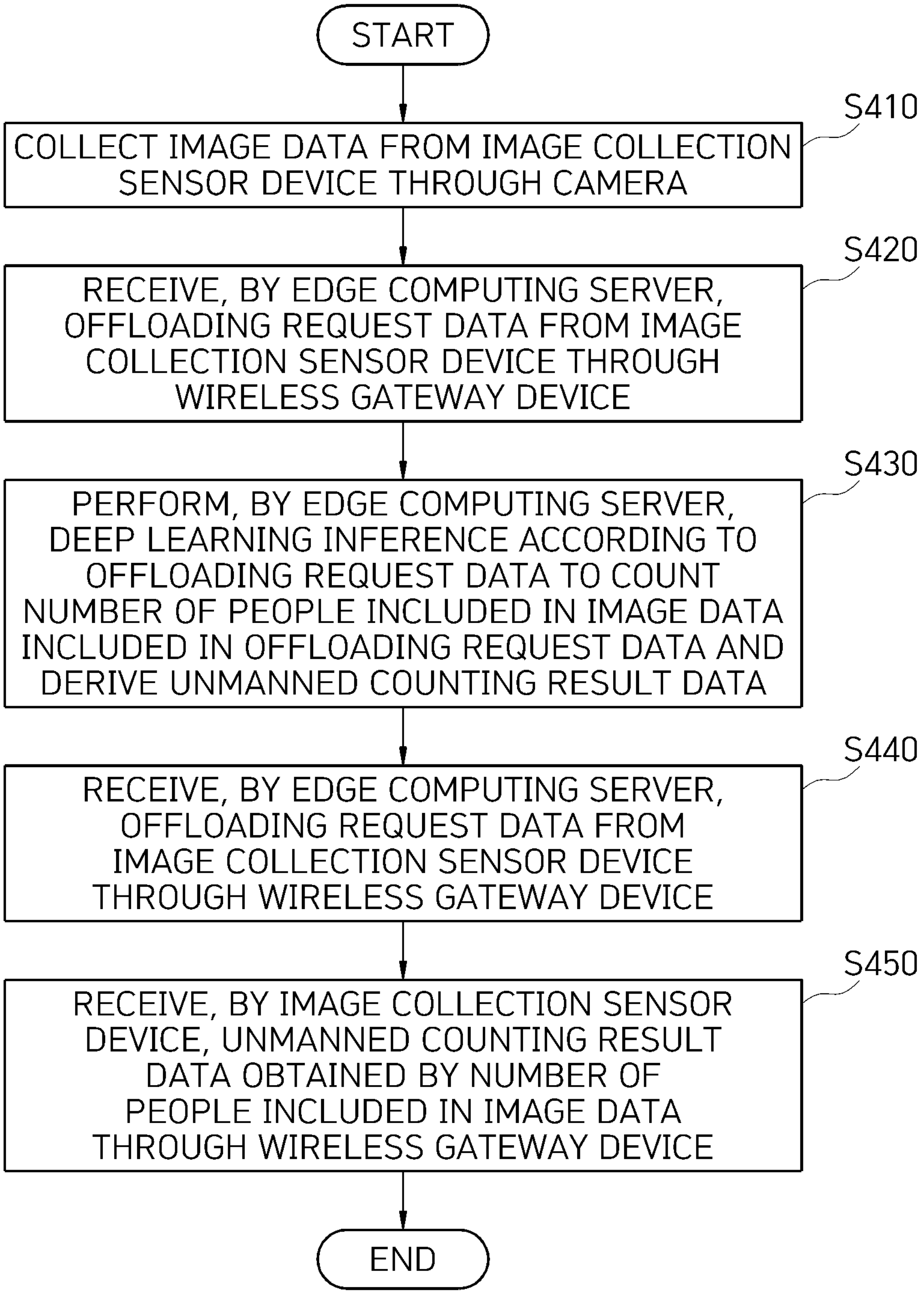
FIG. 11 is a flowchart for describing an edge computing method using the image collection sensor device according to the embodiment of the present invention.

FIG. 11 is a flowchart for describing an edge computing method using the image collection sensor device according to the embodiment of the present invention.

As illustrated in FIG. 11, the edge computing method using the image collection sensor device according to the embodiment of the present invention may include steps S410 to S450.

Step S410 is a step of collecting the image data through the camera in the image collection sensor device.

Step S420 is a step of receiving, by the edge computing server, the image data, the unmanned counting result data in the previous image data, the image sensor parameter determined from the unmanned counting result data in the previous image data, and the offloading request data including the deep learning inference request flag from the image collection sensor device through the wireless gateway device. In one embodiment, the unmanned counting result data may further include face position information and face size information of a person in the image data.

In step S430, the edge computing server performs the deep learning inference according to the offloading request data to count the number of persons included in the image data included in the offloading request data and derive the unmanned counting result data. In one embodiment, step S430 may include receiving, by the edge computing server, the image data collected and encoded according to the collection cycle of the image data through the wireless gateway device and performing deep learning inference according to the offloading request data to count the number of persons included in the image data included in the offloading request data and derive the unmanned counting result data.

Step S440 is a step of receiving, by the image collection sensor device, the unmanned counting result data, in which the number of persons included in the image data is counted, through the wireless gateway device.

Step 450 is a step of analyzing, by the image collection sensor device, the unmanned counting result data to determine the image sensor parameter of the image data. In one embodiment, the image sensor parameters may include the collection cycle of the image data and the collection image quality of the image data.

In one embodiment, step S450 may include a step of determining, by the image collection sensor device, the collection cycle of the image data from information on the number of persons in the image data, determining the collection image quality of the image data from the face size information of a person in the image data, controlling to collect the image data according to the collection cycle of the image data and encode the collected image data according to the collection image quality of the image data, and transmitting the image data encoded according to the collection image quality of the image data to the wireless gateway device.

Thereafter, again, the edge computing method using the image collection sensor device returns to S410 and starts. In this case, step S430 may include receiving, by the edge computing server, the image data collected and encoded according to the collection cycle of the image data through the wireless gateway device and performing deep learning inference according to the offloading request data to count the number of persons included in the image data included in the offloading request data and derive the unmanned counting result data.

The performing of the deep learning inference according to the offloading request data to count the number of persons included in the image data included in the offloading request data and derive the unmanned counting result data may include selecting, by the edge computing server, the deep learning model corresponding to the offloading request, performing the pre-processing of the image data to perform the inference calculation of the deep learning model, performing the inference calculation of the deep learning model, and post-processing the inference calculation result value of the deep learning model to derive the unmanned counting result data.

The above-described edge computing method using an image collection sensor device has been described with reference to flowcharts presented in the drawings. For simplicity, the method has been illustrated and described as a series of blocks, but the invention is not limited to the order of the blocks, and some blocks may occur with other blocks in a different order or at the same time as illustrated and described in the present specification. Also, various other branches, flow paths, and orders of blocks that achieve the same or similar result may be implemented. In addition, all the illustrated blocks may be not required for implementation of the methods described in the present specification.

Meanwhile, in the description with reference to FIG. 11, each operation may be further divided into additional operations or combined into fewer operations according to an implementation example of the present invention. Also, some steps may be omitted if necessary, and an order between the operations may be changed. In addition, the contents of FIGS. 1 to 10 may be applied to the contents of FIG. 11 even if other contents are omitted. Also, the contents of FIG. 11 may be applied to the contents of FIGS. 1 to 10.

For reference, the components according to the embodiment of the present invention may be implemented in the form of software or hardware such as a digital signal processor (DSP), a field programmable gate array (FPGA), or an application specific integrated circuit (ASIC), and perform predetermined roles.

However, "components" are not limited to software or hardware, and each component may be configured to be in an addressable storage medium or to reproduce one or more processors.

Accordingly, for example, the component includes components such as software components, object-oriented software components, class components, and task components, processors, functions, attributes, procedures, subroutines, segments of a program code, drivers, firmware, a microcode, a circuit, data, a database, data structures, tables, arrays, and variables.

Components and functions provided within the components may be combined into a smaller number of components or further divided into additional components.

Meanwhile, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block (s) of the flow chart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block(s) of the flowchart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously illustrated may be simultaneously performed in fact or be performed in a reverse sequence depending on corresponding functions.

The term "~unit" or "~module" used in the specification refers to a software component or a hardware component such as FPGA or ASIC, and the "~unit" or "~module" performs certain roles. However, the term "~unit" or "module" is not meant to be limited to software or hardware. The "~unit" or "module" may be configured to be stored in a storage medium that can be addressed or may be configured to regenerate one or more processors. Accordingly, as an example, the "~unit" or "module" refers to components such as software components, object-oriented software components, class components, and task components, processes, functions, attributes, procedures, subroutines, segments of program code, drivers, firmware, microcode, circuits, data, databases, data structures, tables, arrays and variables. Functions provided in components, and the "~unit" or "~modules" may be combined into fewer components, and "~unit" or "~modules" or further separated into additional components, and "~unit" or "~modules." In addition, components and "~or/er" or "~modules" may be implemented to play one or more CPUs in a device or a secure multimedia card.

According to an embodiment of the present invention, it is possible to provide high-precision unmanned counting service in real time by using a low-power wireless image collection sensor device that is applied with deep learning offloading technology in an edge computing environment and operated with a battery in an environment where constant power supply is impossible.

In addition, according to an embodiment of the present invention, it is possible to accurately count the number of persons included in image data collected by an image collection sensor device not equipped with AI computing acceleration devices (GPU, FPGA, AI chip, etc.).

In addition, according to an embodiment of the present invention, it is possible to minimize battery power consumption by adjusting a collection cycle of image data of an image collection sensor device according to whether there is a person within an area captured by an image collection sensor device.

In addition, according to an embodiment of the present invention, it is possible to provide a high-precision unmanned counting service by changing a deep learning model according to a counting environmental change (face image size and number of faces) within an area captured by an image collection sensor device.

Effects which can be achieved by the present invention are not limited to the above-described effects. That is, other objects that are not described may be obviously understood by those skilled in the art to which the present invention pertains from the following description.

Although exemplary embodiments of the present invention have been disclosed above, it may be understood by those skilled in the art that the present invention may be variously modified and changed without departing from the scope and spirit of the present invention described in the following claims.

What is claimed is:

1. An image collection sensor device, comprising:

a camera module configured to collect and encode image data through a camera;

a communication module configured to transmit the image data collected from the camera module to a wireless gateway device and receive unmanned counting result data, in which a number of persons included in the image data is counted, from the wireless gateway device; and a sensor control module configured to analyze the received unmanned counting result data to determine image sensor parameters of the image data collected from the camera module, and control the camera module or the communication module according to the determined image sensor parameters, wherein the communication module further includes an offloading request transmitting unit configured to transmit image data encoded in the camera module, unmanned counting result data in previous image data, image sensor parameters determined from unmanned counting result data in the previous image data, and offloading request data including a deep learning inference request flag to the wireless gateway device.

2. The image collection sensor device of claim 1, wherein the unmanned counting result data further includes face position information and face size information of a person in the image data, and the communication module may include an unmanned counting result receiving unit configured to receive the unmanned counting result data from the wireless gateway device.

3. The image collection sensor device of claim 2, wherein the image sensor parameter includes a collection cycle of the image data and a collection image quality of the image data, and the sensor control module includes an image sensor parameter determination unit configured to determine a collection cycle of the image data from information on the number of persons in the image data, and to determine the collection image quality of the image data from the face size information of the person in the image data.

4. The image collection sensor device of claim 1 wherein the sensor control module further includes a control unit configured to control the camera module to collect the image data according to a collection cycle of the image data and encode the collected image data according to a collection image quality of the image data, and to control the offloading request transmitting unit to transmit the image data encoded according to the collection image quality of the image data to the wireless gateway device.

5. The image collection sensor device of claim 1, wherein, when transmitting the offloading request data, the offloading request transmitting unit periodically transmits a high-precision deep learning inference request flag according to a predetermined high-precision deep learning inference request cycle.

6. An unmanned counting edge computing system, comprising:

an image collection sensor device configured to collect and encode image data through a camera, and analyze unmanned counting result data in which the number of persons included in the image data is counted to determine image sensor parameters of the image data;

a wireless gateway device configured to receive the image data, unmanned counting result data in previous image data, image sensor parameters determined from unmanned counting result data in the previous image data, and offloading request data including a deep learning inference request flag from the image collection sensor device and transmit the image data, the unmanned counting result data, the image sensor parameter, and the offloading request data; and an edge computing server configured to perform deep learning inference according to the offloading request data received from the wireless gateway device to count the number of persons included in the image data included in the offloading request data and derive the unmanned counting result data.

7. The unmanned counting edge computing system of claim 6, wherein the unmanned counting result data further includes face position information and face size information of a person in the image data, and the image collection sensor device receives the unmanned counting result data from the wireless gateway device.

8. The unmanned counting edge computing system of claim 7, wherein the image sensor parameter includes a collection cycle of the image data and a collection image quality of the image data, and the image collection sensor device determines a collection cycle of the image data from information on the number of persons in the image data, determines the collection image quality of the image data from face size information of a person in the image data, determines a collection cycle of the image data, controls to collect the image data according to the collection cycle of the image data and encode the collected image data according to the collection image quality of the image data, and transmits the image data encoded according to the collection image quality of the image data to the wireless gateway device, and the edge computing server receives the image data collected and encoded according to the collection cycle of the image data through the wireless gateway device, and performs deep learning inference according to the offloading request data to count the number of persons included in the image data included in the offloading request data and derive the unmanned counting result data.

9. The unmanned counting edge computing system of claim 6, wherein the edge computing server includes:

an offloading request receiving unit configured to receive the offloading request data transmitted from the wireless gateway device;

a deep learning inference calculation unit configured to select a deep learning model corresponding to the offloading request data, and drive an inference engine of the selected deep learning model to count the number of persons included in the image data included in the offloading request data and derive the unmanned counting result data; and an unmanned counting result transmitting unit configured to transmit the unmanned counting result data to the image collection sensor device.

10. The unmanned counting edge computing system of claim 9, wherein the deep learning inference calculation unit includes:

a deep learning model selection unit configured to select a deep learning model corresponding to the offloading request data;

a deep learning inference pre-processing unit configured to perform preprocessing of the image data in order to perform an inference calculation of the deep learning model;

a deep learning inference engine unit configured to perform an inference calculation of the deep learning model; and a deep learning inference post-processing unit configured to post-process an inference calculation result value of the deep learning model to derive the unmanned counting result data.

11. An unmanned counting edge computing method, comprising:

collecting image data through a camera in an image collection sensor device;

receiving, by an edge computing server, the image data, unmanned counting result data in previous image data, image sensor parameters determined from unmanned counting result data in the previous image data, and offloading request data including a deep learning inference request flag from the image collection sensor device through a wireless gateway device;

performing, by the edge computing server, deep learning inference according to the offloading request data to count the number of persons included in the image data included in the offloading request data and derive the unmanned counting result data;

receiving, by the image collection sensor device, unmanned counting result data, in which the number of persons included in the image data is counted, through the wireless gateway device; and analyzing, by the image collection sensor device, the unmanned counting result data to determine image sensor parameters of the image data.

12. The unmanned counting edge computing method of claim 11, wherein the unmanned counting result data further includes face position information and face size information of a person in the image data.

13. The unmanned counting edge computing method of claim 12, wherein the image sensor parameter includes a collection cycle of the image data and a collection image quality of the image data, and the determining of the image sensor parameter of the image data includes:

determining, by the image collection sensor device, a collection cycle of the image data from information on the number of persons in the image data;

determining a collection image quality of the image data from the face size information of a person in the image data;

controlling to collect the image data according to the collection cycle of the image data and encode the collected image data according to the collection image quality of the image data; and transmitting the image data encoded according to the collection image quality of the image data to the wireless gateway device, and the deriving of the unmanned counting result data includes:

receiving, by the edge computing server, the image data collected and encoded according to the collection cycle of the image data through the wireless gateway device; and performing deep learning inference according to the offloading request data to count the number of persons included in the image data included in the offloading request data and derive the unmanned counting result data.

14. The unmanned counting edge computing method of claim 13, wherein the performing of the deep learning inference according to the offloading request data to count the number of persons included in the image data included in the offloading request data and derive the unmanned counting result data includes:

selecting, by the edge computing server, a deep learning model corresponding to offloading request;

performing pre-processing of the image data to perform an inference calculation of the deep learning model;

performing the inference calculation of the deep learning model; and post-processing an inference calculation result value of the deep learning model to derive the unmanned counting result data.

* * * * *